United States Patent
Kitagawa

[11] Patent Number: 5,992,084
[45] Date of Patent: Nov. 30, 1999

[54] FISHING LURE WITH A MOVABLE WEIGHT MOUNTED INSIDE THEREOF

[75] Inventor: Yasuhiro Kitagawa, Dainichi Ohaza, Japan

[73] Assignee: Yo-Zuri Co., Ltd., Takeo, Japan

[21] Appl. No.: 09/113,300

[22] Filed: Jul. 10, 1998

Related U.S. Application Data

[63] Continuation-in-part of application No. 08/694,335, Aug. 8, 1996, abandoned.

[30] Foreign Application Priority Data

Mar. 5, 1996 [JP] Japan ................................ 8-047534

[51] Int. Cl.⁶ .................................................. A01K 85/16
[52] U.S. Cl. ........................ 43/42.31; 43/42.39; 43/42.35; 43/42.22
[58] Field of Search ................................ 43/42.31, 42.39, 43/42.22, 42.35

[56] References Cited

U.S. PATENT DOCUMENTS

| | | | |
|---|---|---|---|
| 1,394,313 | 10/1921 | Leeper | 43/42.39 |
| 2,270,487 | 1/1942 | Withey | 43/42.31 |
| 2,488,678 | 11/1949 | Nardi | 43/42.31 |
| 2,878,611 | 3/1959 | Netherton et al. | 43/42.06 |
| 2,965,996 | 12/1960 | Hughes | 43/42.22 |
| 3,044,207 | 7/1962 | Dorsett | 43/42.31 |
| 4,079,539 | 3/1978 | Holstein | 43/43.13 |
| 4,155,191 | 5/1979 | Spivey | 43/42.22 |
| 4,223,469 | 9/1980 | Luz | 43/42.31 |
| 4,380,132 | 4/1983 | Atkinson | 43/42.31 |
| 4,483,091 | 11/1984 | Norlin | 43/42.31 |
| 4,712,326 | 12/1987 | Hoover et al. | 43/42.31 |
| 4,747,228 | 5/1988 | Giovengo, Jr. | 43/42.31 |
| 4,761,910 | 8/1988 | Ninomiya | 43/42.31 |
| 4,791,750 | 12/1988 | Gammill | 43/42.31 |
| 5,134,799 | 8/1992 | Trnka | 43/42.22 |
| 5,329,721 | 7/1994 | Smith | 43/42.22 |
| 5,561,938 | 10/1996 | Kato et al. | 43/42.22 |
| 5,566,498 | 10/1996 | Itoh | 43/42.31 |
| 5,822,912 | 10/1998 | Kato et al. | 43/42.22 |
| 5,924,236 | 7/1999 | Preston | 43/42.31 |

FOREIGN PATENT DOCUMENTS 19431 of 1891 United Kingdom .................. 43/42.39

*Primary Examiner*—Thomas Price
*Assistant Examiner*—Darren W. Ark
*Attorney, Agent, or Firm*—Nikaido Marmelstein Murray & Oram LLP

[57] ABSTRACT

A fishing lure includes a lure body with a longitudinal axis defining a longitudinal hollow extending along the longitudinal axis of the lure body which defines an inwardly facing circumferential wall of the lure body, a weight mounted within the longitudinal hollow in such a manner as to move back and forth along a substantially center line of the longitudinal hollow, and a weight holding member disposed on the inwardly facing circumferential wall of the lure body closer to a forward end of the lure body in such a manner as to hold the weight via magnetic force acting between the weight and the weight holding member.

20 Claims, 10 Drawing Sheets

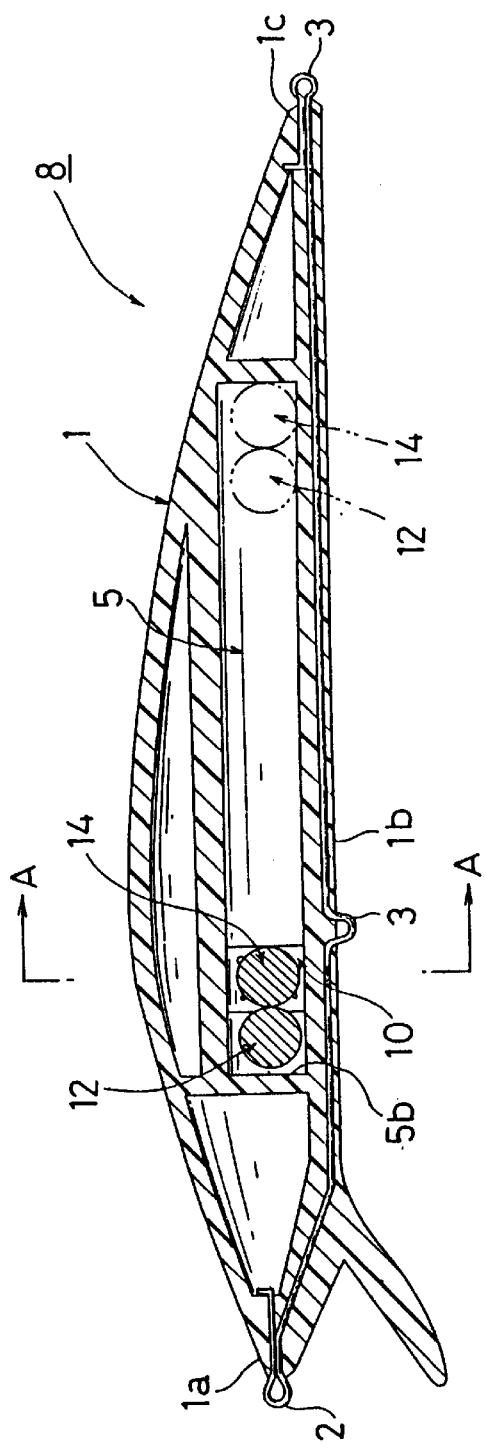
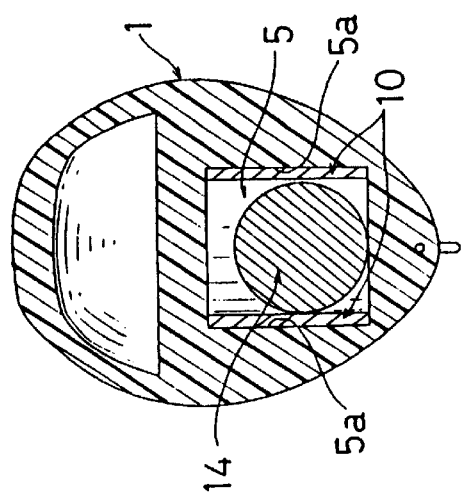

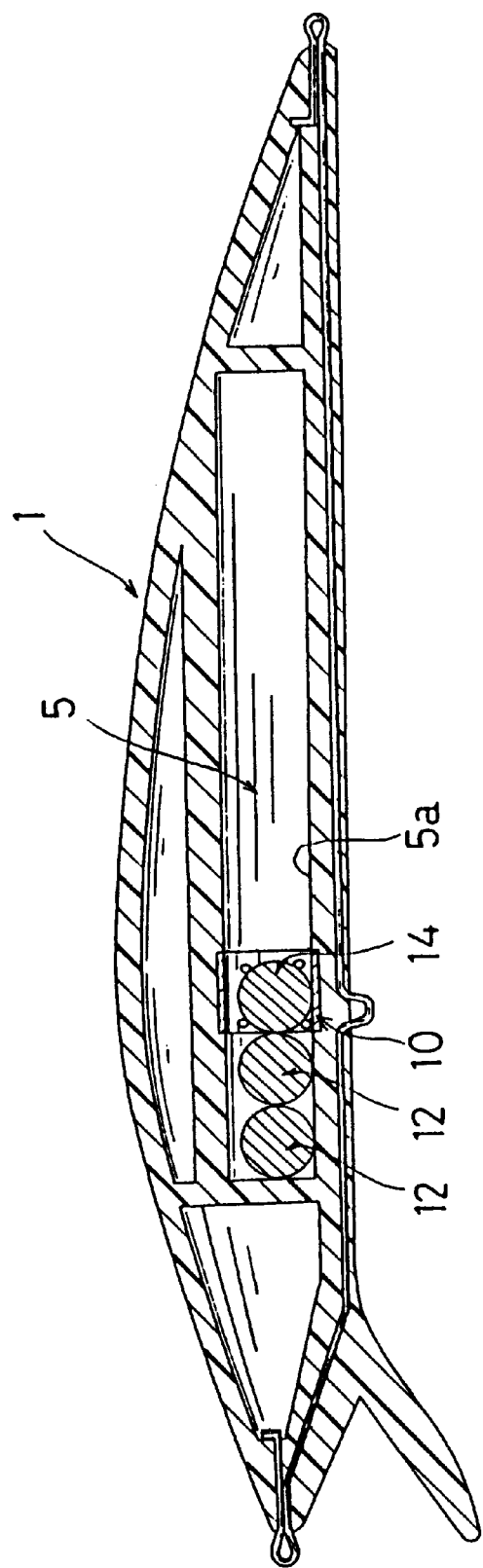

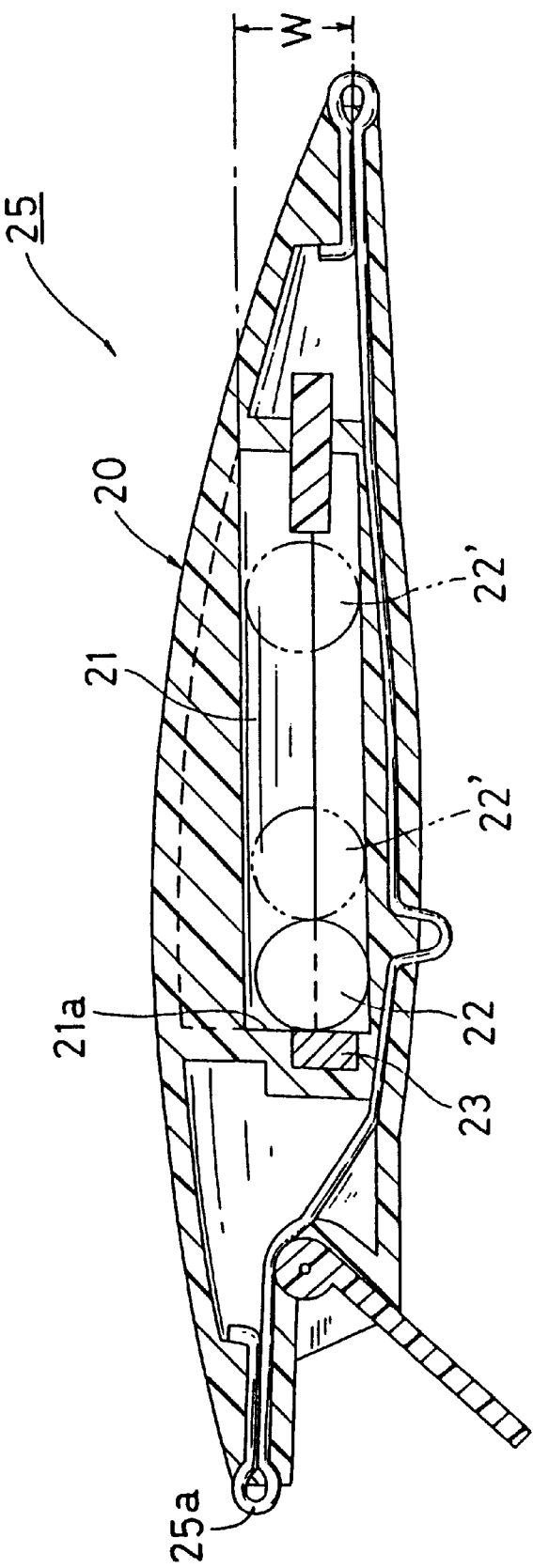

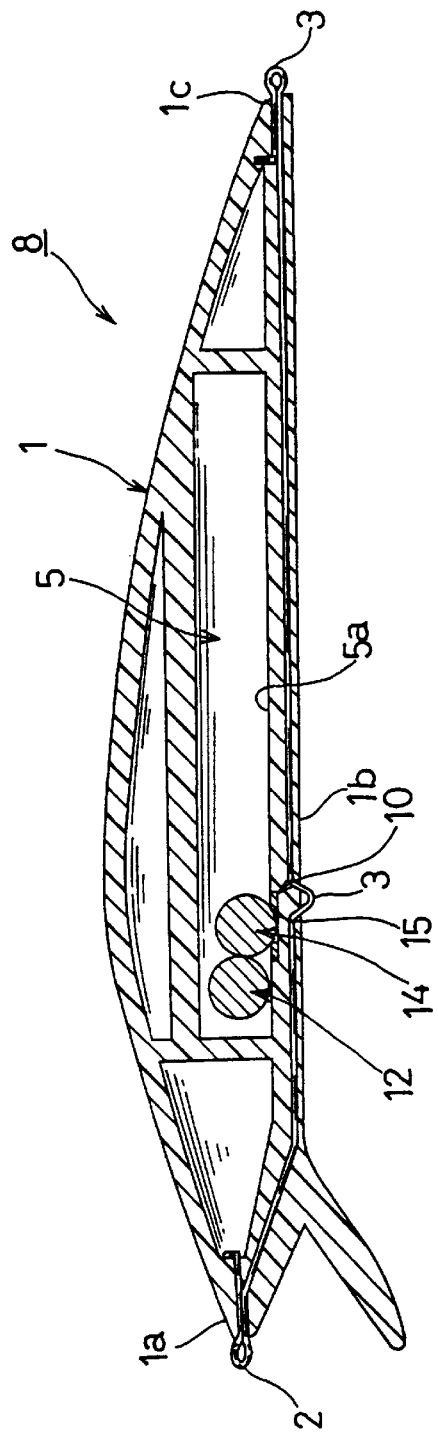

FISHING LURE WITH A MOVABLE WEIGHT MOUNTED INSIDE THEREOF

This is a Continuation-in-Part of application Ser. No. 08/694,335 filed Aug. 8, 1996 now abandoned.

BACKGROUND OF THE INVENTION

This invention relates to a fishing lure, and more particularly to a fishing lure with a movable weight mounted inside thereof.

Referring to FIG. 9, a fishing lure 25 of a conventional type with the movable weight disclosed, for example, in Japanese Utility Model Publication No. 3-15021 comprises a lure body 20 with an exterior appearance resembling a bait fish and a longitudinal hollow 21 extending in the longitudinal direction of the lure body 20, a steel ball 22 as a weight mounted within the longitudinal hollow 21 in such a manner as to move back and forth along a substantially center line of the longitudinal hollow 21, and a magnet 23 disposed on a rearwardly facing wall 21a defining the longitudinal hollow 21 for holding the steel ball 22 via its magnetic force.

The fishing lure of this type enables the steel ball 22 to move backward via the force of inertia effected by casting the fishing lure in such a manner as to direct the forward end of the lure body 20 towards a target point. As a result, the fishing lure 25 may be casted a longer distance.

At the moment of that the fishing lure has landed on the water, the steel ball 22 is moved forward, and then attracted and held by the magnet 23 in position within the longitudinal hollow 21, so that the center of gravity is transferred to a front portion of the lure body 20. This movement of the steel ball 22 facilitates a rear portion of the fishing lure to swing through the water by drawing a fishline connected thereto. The fishing lure resembles a swimming fish via this motion, and therefore can attract a fish.

The fishing lure 25 of this type is provided at its inner and rearwardly facing wall 21a partly defining the longitudinal hollow 21 with the magnet 23 so that the magnetic force effected by the magnet 23 acts in the longitudinal direction of the longitudinal hollow 21. Since the fishing lure 25 is usually connected to the fishline at a front end 25a thereof, the front end 25a first moves forwardly so that the steel ball 22 is subjected to the force of inertia acting in the longitudinal direction of the longitudinal hollow, which direction is the same as that of the magnetic force effected by the magnet 23. This may necessitate a relatively strong force of the inertia for releasing the steel ball 22 from the magnet 23.

As is apparent from the above reason, the steel ball 22 can be released from the magnet 23 by casting a fishing lure 25 with a snap of the wrist in such a manner as to apply an abrupt force to the steel ball 22. However, this casting motion may not be easily performed by an angler with a poor skill. Unless the steel ball 22 is released from the magnet 23, the center of gravity does not move the rear portion of the fishing lure 25, which poses a problem, that is, the above described advantage can not be obtained.

The fishing lure 25 of this type poses another problem in view of its configuration. That is, when the lure body 20 has a relatively narrow configuration, the distance W of the longitudinal hollow 21 inevitably becomes narrower, and a resultant space which accommodates the steel ball 22 becomes smaller, and may not sufficiently act as a weight.

To increase the weight of the steel ball, the fishing lure 25, which has two or more steel balls 22, 22' within the longitudinal hollow 21, is conceivable. In this arrangement, the rear steel ball 22' is indirectly attracted by the magnet via the front steel ball 22, and therefore magnetic force acting over the rear steel ball 22' is weakened. Under this condition, it is likely that the rear steel ball 22' is unintentionally released from the magnet, and moves to the rear portion of the lure body in the water. Once the center of gravity has been transferred to the rear portion of the lure body, the rear portion becomes stable, and does not smoothly and largely swing. This may lower an effect to attract the fish.

It is an object of the present invention to provide a fishing lure which enables the weight mounted within the hollow of the lure body to be easily released from the initial position thereof even via a relatively slow casting motion.

It is another object of the present invention to provide a fishing lure with a plurality of the weights, which enables all the weights to easily move the rear portion of the lure body at the moment of casting, and to be securely held at a predetermined position after the lure has landed on the water.

SUMMARY OF THE INVENTION

In accordance with the above objects, a fishing lure of the present invention includes a lure body with a longitudinal axis defining a longitudinal hollow extending along the longitudinal axis of the lure body, a weight mounted within the longitudinal hollow in such a manner as to move back and forth along a substantially center line of the longitudinal hollow, and a weight holding member disposed on an inwardly facing circumferential wall of the lure body closer to a forward end of the lure body in such a manner as to hold the weight via magnetic force acting between the weight and the weight holding member.

With the above arrangement, magnetic force acts in the transverse direction of the longitudinal hollow of the lure body, since the weight holding member is disposed on the inwardly facing circumferential wall of the lure body. Accordingly, when the fishing lure is casted, the force of inertia acts in the longitudinal direction of the lure body. The weight which is not subjected to the magnetic force acting in the same direction as the direction of the force of inertia is likely to roll out of the weight holding member, and consequently is released therefrom.

Accordingly, the weight is likely to be released from the weight holding member and move to the rear portion of the lure body, even if the fishing lure is slowly casted.

In the following description, the term "magnetic substance" is used to refer to a substance which possesses magnetism by the effect of magnet, and can be attracted by magnet, and the term "nonmagnetic substance" to a substance which does not substantially and inherently possess magnetism even by the effect of magnet, and is not be attracted by magnet.

BRIEF DESCRIPTION OF THE DRAWINGS

FIG. 4 is a cross section illustrating a fishing lure in accordance with a second embodiment of the present invention.

FIG. 5 is a cross section taken along a line of A—A of FIG. 4.

FIG. 6 is a cross section illustrating a fishing lure of another embodiment which has a different number of the weights from the first and second embodiments.

FIG. 9 is a cross section illustrating a conventional fishing lure.

FIG. 10 is a cross section illustrating a fishing lure in accordance with a third embodiment of the present invention.

FIG. 11 is a perspective view illustrating a weight holding member of the third embodiment.

DETAILED DESCRIPTION OF THE PREFERRED EMBODIMENTS

First Embodiment

Figure 1:
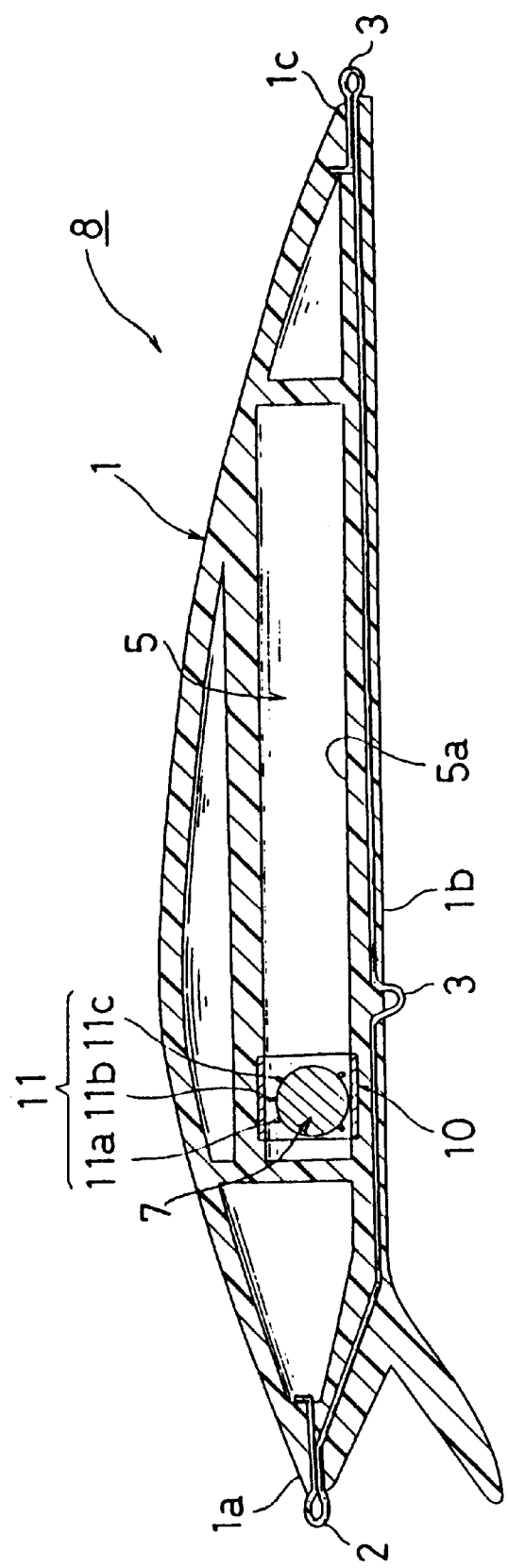
FIG. 1 is a cross section illustrating a fishing lure in accordance with a first embodiment of the present invention.
Figure 2:
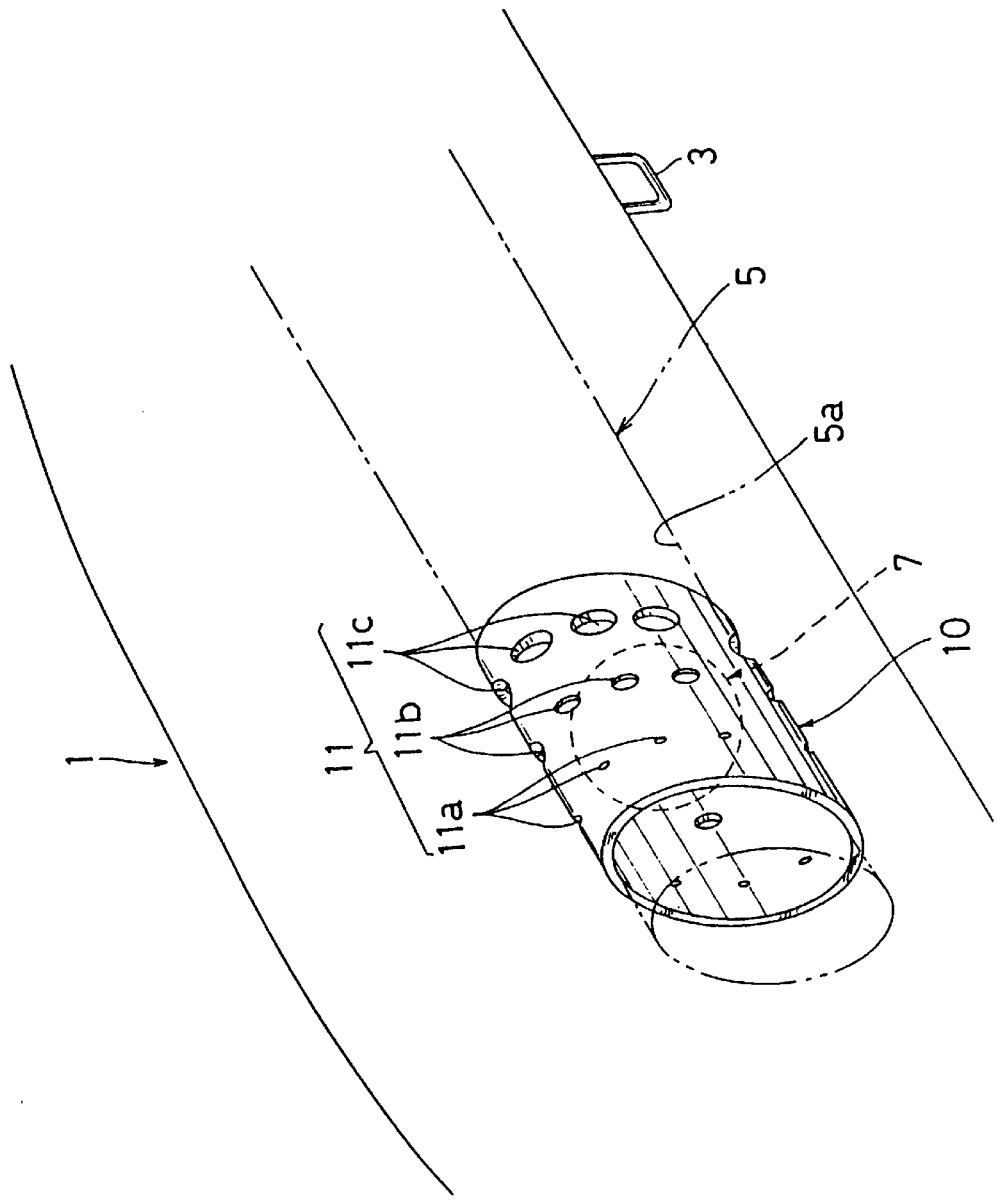
FIG. 2 is an enlarged perspective view illustrating a longitudinal hollow of the fishing lure, weight and weight holding member.

Referring to FIGS. 1 and 2, a lure body 1 has an exterior appearance closely resembling a bait fish, and is provided at its front end 1a with a line connecting portion or a nose ring 2, and at its middle portion 1b and rear end 1c with hook connecting portions 3 respectively.

The lure body 1 defines a longitudinal hollow 5 having a cylindrical shape which extends in the longitudinal direction of the lure body 1, within which a weight 7 is mounted. The weight 7 is made of magnet and formed into a spherical shape with a diameter slightly smaller than that of the longitudinal hollow 5, so that the weight 7 can move back and forth along a substantially center line of the longitudinal hollow 5.

An annular weight holding member 10 is disposed on a circumferential wall 5a of the longitudinal hollow 5 closer to a forward end of the longitudinal hollow 5 so that a surface of the weight holding member 10 becomes flush with a surface of the circumferential wall 5a. The weight holding member 10 is made of a magnetic substance such as iron.

A plurality of through holes 11 are aligned in the weight holding member 10 in such a manner as to increase the diameter as they approach the rear portion of the weight holding member 10. In this embodiment, the through holes 11a, 11b and 11c of three different diameters are defined in the weight holding member 10 so that the surface area or amount of the weight holding member 10 is gradually reduced as it approaches its rear portion.

With the above arrangement of the weight holding member 10, the magnetic force effected by the weight 7 acts in the transverse direction of the longitudinal hollow 5, enabling the weight 7 to come into contact with and be held in position by the weight holding member 10.

Figure 3:
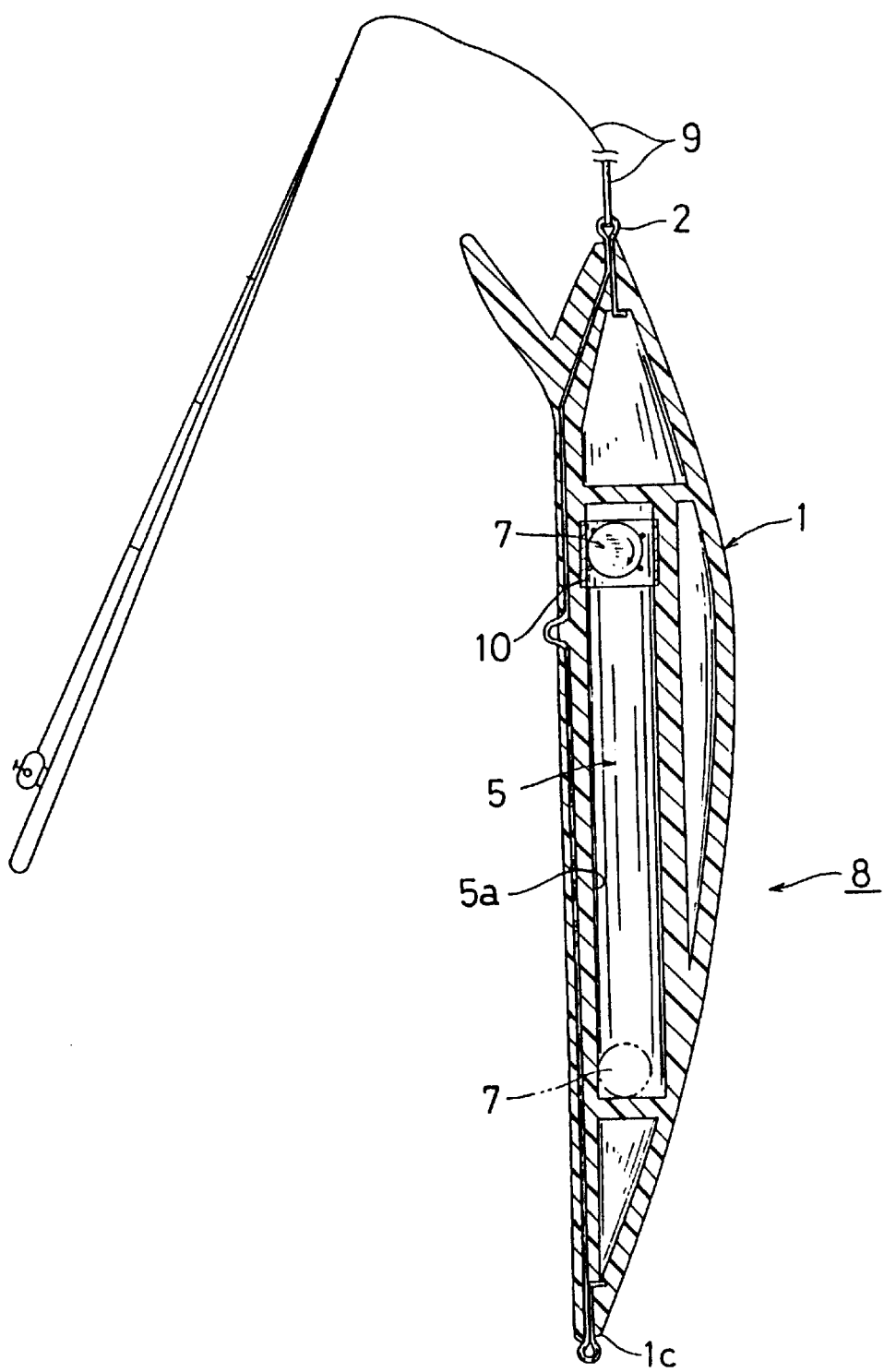
FIG. 3 is a cross section of the fishing lure in an actual use.

Referring to FIG. 3, a fishing lure 8 is suspended by the fishline 9 at a first stage of the casting so that the rear end 1c thereof faces downwardly, and the weight 7 is held by the weight holding member 10 with its surface vertical to the ground. At the moment of casting the fishing lure 8, the weight 7 rolls out of the weight holding member 10 via the force of inertia, as illustrated by the arrow. In this regard, the weight can easily be moved towards the rear end 1c of the lure body 1 via a relatively weak force of the inertia, since the magnetic force does not act in the same direction as that of the force of the inertia acting over the weight 7.

Once the weight 7 rolls towards the rear portion 1c, such movement is accelerated by the arrangement of the through-holes 11a, 11b and 11c, which reduces the magnetic force acting over the weight 7 as described above. Accordingly, a relatively slow casting motion enables the weight 7 to move towards the rear portion 1c, as illustrated by the two-dot long and two short dashes line.

Since the fishing lure 8 is generally formed into a streamline shape, which necessitates the circumferential wall 5a to be formed into a smaller dimension, it is difficult to dispose the weight 7 of a relatively large size on the circumferential wall 5a. If the weight holding member 10 is made of magnet, it may be difficult to form the magnet into a thin plate in simple and cheap manners due to an inherent property of the magnet, while maintaining the sufficient magnetic force. However, since the fishing lure 8 of this embodiment enables the weight holding member 10 to be made of a thin steel plate, and the magnetic force is unlikely to be undesirably affected by the weight holding member 10 of the thin plate, the problem associated with the weight holding member 10 of magnet can be avoided. Thus, the weight holding member 10 can be disposed within such a reduced space.

Second Embodiment

In the description of the second embodiment, arrangements which are different from those of the first embodiment will mainly be discussed.

Referring to FIGS. 4 and 5, the lure body 1 defines the longitudinal hollow 5 of a substantially rectangular cross section, within which front and rear weights 12 and 14, each having a spherical shape, are mounted in such a manner as to be moved back and forth, the former being made of a nonmagnetic substance such as lead, and the latter being made of magnet.

A pair of the weight holding members 10, each having a flat shape, are respectively disposed on the opposite longitudinal walls 5a' with a space to a front wall 5b corresponding in length to a diameter of the front weight 12.

This arrangement enables the front weight 12 of nonmagnetic substance to freely move back and forth within the longitudinal hollow 5 without the magnetic influence of the rear weight 14 and the weight holding members 10. On the other hand, the rear weight 14 of magnet is movable as the front weight 12, but is arrested by the weight holding member 10 when moving closer to the front portion of the longitudinal hollow 5.

With this arrangement, the rear weight 14 can be released from the weight holding member 10 and moved towards the rear portion of the lure body 1, even if the fishing lure 8 is slowly casted. On the other hand, the front weight 12 of nonmagnetic substance is smoothly moved towards the rear portion of the lure body without the magnetic influence of the rear weight 14 and the weight holding members 10. Thus, the center of gravity is smoothly transferred to the rear portion of the lure body 1.

At the moment of that the fishing lure 8 is landed on the water, the front and rear weights 12 and 14 are moved towards the front portion of the longitudinal hollow 5, and the rear weight 14 is arrested by the weight holding member via the magnetic force. Thus, the center of gravity is transferred to the front portion of the lure body 1. The rear weight 14, which is directly held by the weight holding member, is unlikely to be unintentionally released therefrom, and acts as a block to prevent the front weight 12 from moving towards the rear portion of the longitudinal hollow 5.

Accordingly, it is unlikely that the rear weight 14 is solely released from the weight holding member 10, which may occur in the conventional lure. After the fishing lure 8 is landed on the water, the center of gravity is transferred to the front portion of the lure body 1 so that the fishing lure 8 can move through the water with its rear portion swinging, as the fishline is drawn.

Third Embodiment

In the description of the third embodiment, arrangements which are different from those of the first embodiment will mainly be discussed.

In the third embodiment, two or more weights are mounted, and the weight holding member is disposed in a lower portion of the circumferential wall 5a of the longitudinal hollow 5 closer to the forward end of the longitudinal hollow 5. In this regard, the lower portion of the circumferential wall 5a is meant to be the lower portion of the circumferential wall 5a when the lure is drawn in the water.

Referring to FIG. 10, the front weight 12 of a nonmagnetic substance such as lead, and the rear weight 14 formed of a magnet are mounted within the longitudinal hollow 5. The weight holding member 10 is made of a magnetic substance such as iron, and is formed into a plate 13 of a ring shape defining a hole or concave 15 at its center, as illustrated in FIG. 11. The hole or concave 15 has such a dimension as to enable a part of the rear weight 14 to fit thereto. The weight holding member 10 is fitted into a concave of substantially the same depth as the thickness of the weight holding member 10 defined in the lower portion of the circumferential wall 5a of the longitudinal hollow 5 closer to the forward end of the longitudinal hollow 5 so as to not to protrude outwardly from the circumferential wall.

With the above arrangement, the rear weight 14 can be released from the weight holding member 10 and moved towards the rear portion of the lure body 1, even if the fishing lure 8 is slowly cast. On the other hand, the front weight 12 of nonmagnetic substance is smoothly moved towards the rear portion of the lure body without the magnetic influence of the rear weight 14 and the weight holding member 10. Thus, the center of gravity is smoothly transferred to the rear portion of the lure body 1.

At the moment of that the fishing lure 8 lands on the water, the front and the rear weights 12 and 14 are moved towards the front portion of the longitudinal hollow 5, and the rear weight 14 is arrested by the weight holding member 10 via the magnetic force. Thus, the center of gravity is transferred to the front portion of the lure body 1. The rear weight 14, which is directly held by the weight holding member 10, is unlikely to be unintentionally released therefrom, and acts as a block to prevent the front weight 12 from moving towards the rear portion of the longitudinal hollow 5.

Further, the weight holding member 10 defines the hole or concave 15 therein, so that the rear weight 14 partly falls into the hole or concave 15, and therefore is securely supported by the weight holding member 10.

Other Embodiments

In the above embodiments, the weight holding member 10 is disposed near the front portion of the longitudinal hollow 5. However, the weight holding member 10 may be disposed in various places such as a middle portion between the front and rear ends of the longitudinal hollow 5. This positioning depends on a type of the fishing lure 8. It is essential to dispose the weight holding member 10 on the circumferential wall defining the longitudinal hollow 5. By changing the position of the weight holding member 10, the center of gravity of the fishing lure 8 is adjustable.

It is not necessary to limit the number of the weights mounted within the longitudinal hollow 5 to the second and third embodiments where a plurality of the weights are provided. As illustrated in FIG. 6, a combination of two front weights 12 of nonmagnetic substance and one rear weight 14 of magnet may be employed. Instead, a combination of one front weight 12 and two rear weights 14, a combination of three front weights 12 and one rear weight 14 or a combination of several front weights 12 and several rear weights 14 may be employed. If these arrangements are employed in the conventional lure, the magnetic force indirectly acting over the weights is weakened as the intervening weights increase in number. As a result, the weights which are indirectly attracted by the magnet may easily and unintentionally be released from the arrested position. On the contrary, in accordance with the fishing lure 8 of the present invention, it is unlikely that the weights are not separated from each other, and the center of gravity of the fishing lure 8 is unlikely to be moved after the fishing lure 8 is landed on the water.

As stated in the second and third embodiments where a plurality of the weights are provided, the rear weight 14 of a magnet and the weight holding member 10 of magnetic substance are employed. On the contrary, it may be possible to employ the rear weight 14 of magnetic substance and the weight holding member 10 of a magnet, or the rear weight of a magnet and the weight holding member 10 of a magnet. These combinations are possible because the front weight 12 and the rear weight 14 thus arranged do not attract the front weight 12 of nonmagnetic substance. However, when employing the weight arrangement where two or more rear weights 14 are provided, it is preferable to make the rear weight 14 from magnetic substance when a plurality of the rear weights 14 are mounted within the longitudinal hollow 5. Otherwise, the rear weights 14 of magnet is likely to be attached to each other via magnetic force, which may hesitate their smooth motion in the longitudinal direction within the longitudinal hollow 5.

When employing the weight arrangement where three or more weights are provided, it is preferable to form the rearmost weight (rear weight 14) from a magnet or magnetic substance so as to be attracted by the weight holding member 10 via magnetic force, and form the residual weights (two or more front weights 12) from nonmagnetic substance so as not to be attracted by the weight holding member 10 via magnetic force. the reason for this is that when the weights positioned forwardly than the rear weight 14 is formed to be attracted by the weight holding member 10, such weights act as a block to prevent the rear weight 14 from being held by the weight holding member so that the rear weight 14 becomes undesirably free and therefore movable within the longitudinal hollow 5 even in the case that the lure 8 is landed on the water.

In other words, in case of that a plurality of weights are provided, by the arrangement where the rear weight 14 is attracted and held by the weight holding member 10 via magnet force, and the residual weights positioned forwardly than the rear weight 14 are formed not to be attracted by the weight holding member 10 via magnetic force, each weight becomes movable within the longitudinal hollow 5, and all the weights can be held in position once the rear weight 14 has been attracted and arrested by the weight holding member 10.

Figure 7B:
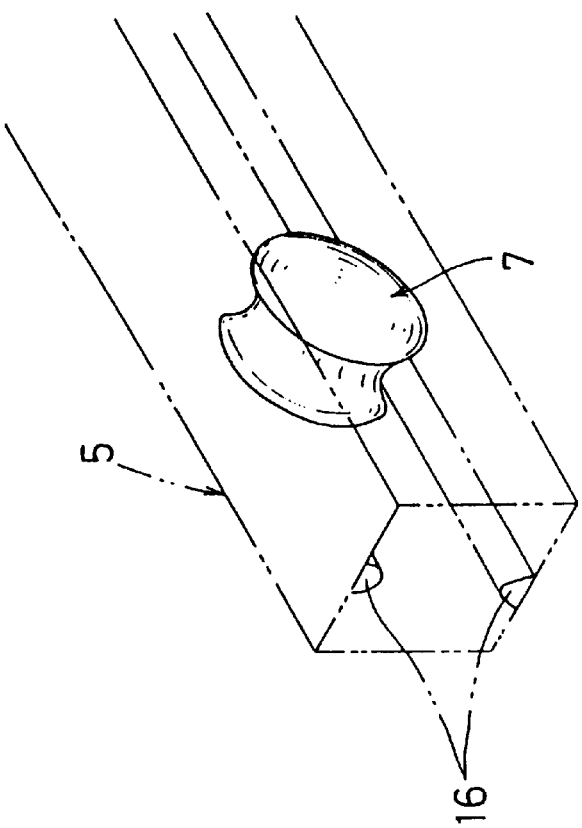
FIGS. 7A and 7B are enlarged perspective views of an essential portion, in which a longitudinal hollow and the weight are different in shape from the above embodiments.
Figure 7A:
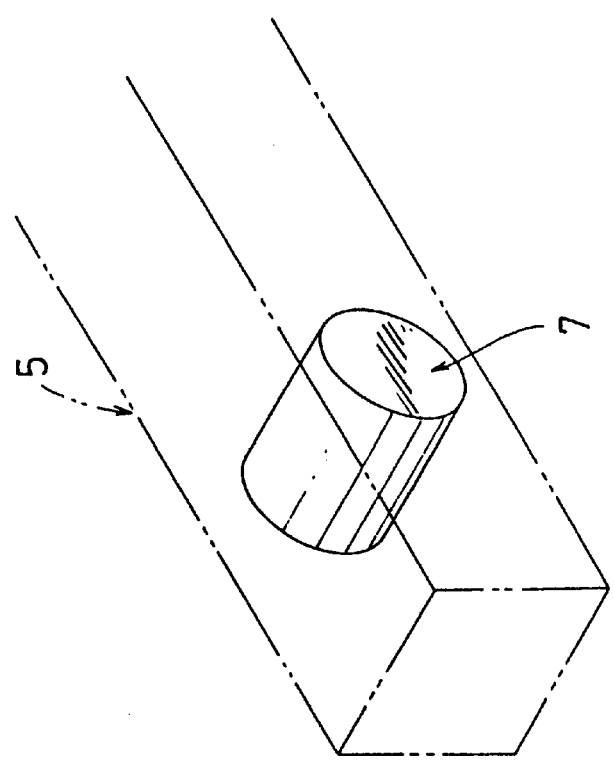

Referring to FIGS. 7A and 7B, the weight 7 may be varied in shape, for example, the weight 7 may be formed into a cylindrical shape with its axis extending transversely to the longitudinal axis of the longitudinal hollow 5, or a wheel shape with an annular groove around its periphery, through which the weight 7 moves along rails 16 formed in the longitudinal hollow 5. It is essential that the weight 7 is movable back and forth within the longitudinal hollow 5.

Figure 8:
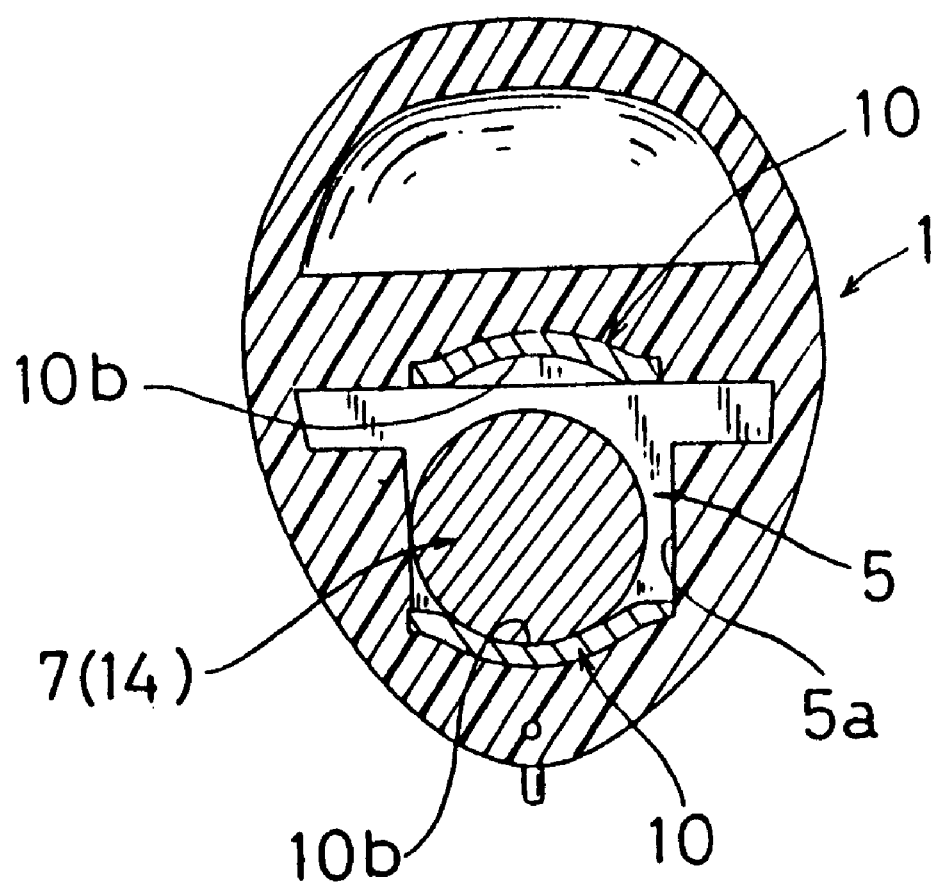
FIG. 8 is a cross section illustrating the weight holding member in accordance with another embodiment of the present invention.

In the above embodiments, the weight holding member 10 is formed so that its surface becomes flush with the inner surface of the circumferential wall 5a. However, a pair of the weight holding member 10 defining a longitudinal concave 10b having an arcuate cross sectional may respectively be mounted at the opposite inner surfaces of the circumferential wall 5a, as illustrated in FIG. 8. With this arrangement, the weight 7 or the weight 14 is arrested at the concaved weight holding member 10, and comes into contact to the same via its relatively large area. As a result, the weight 7 or the weight 14 can more securely be held by the weight holding member 10 than in the above embodiments.

Figure 12:
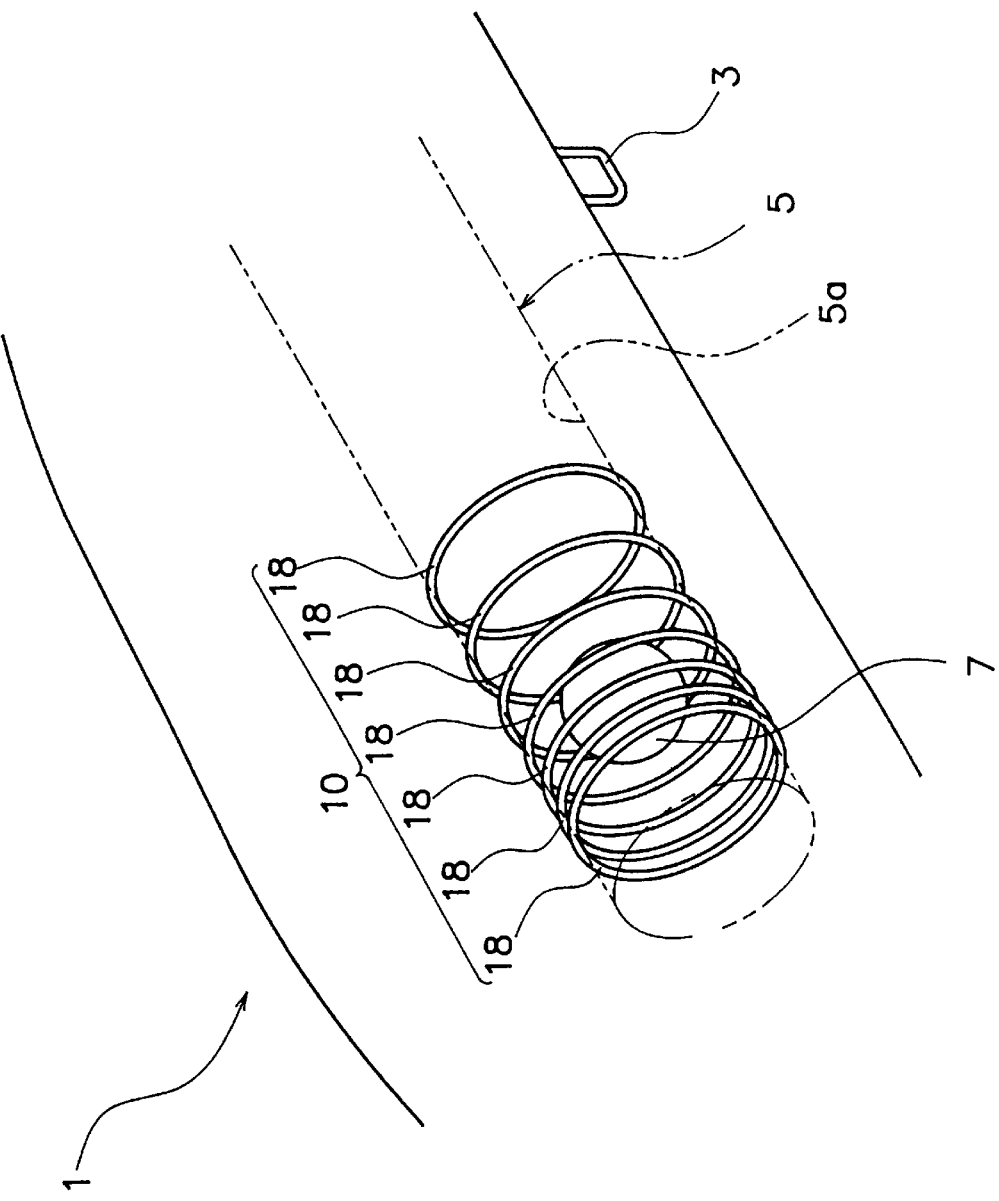
FIG. 12 is an enlarged perspective view illustrating an alternate embodiment of the weight holding member.

In the above embodiments, the magnetic force effected by the weights 7, 14 is gradually reduced as the weight moves towards the rear portion of the weight holding member 10 by a plurality of the through-holes 11a, 11b and 11c of the weight holding member 10. Alternatively as illustrated in FIG. 12, the weight holding member 10 may be made by a plurality of annular rings 18 which are aligned in the axial direction of the longitudinal hollow 5 so that the space from each other is gradually increased as they advance backward. As the magnetic force reducing means of a different form, the weight holding member 10 may be formed in such a manner as to become thinner as it advances backward so that the magnetic force is gradually reduced towards the rear portion of the weight holding member 10. It is essential that the magnetic force reducing means gradually reduces the magnetic force as the weight moves towards the rear portion of the weight holding member 10.

This specification is by no means intended to restrict the present invention to the preferred embodiments set forth therein. Various modifications to the fishing lure with the movable weight mounted inside thereof, as described herein, may be made by those skilled in the art without departing from the spirit and scope of the present invention as defined in the appended claims.

What is claimed is:

1. A fishing lure comprising a lure body having a longitudinal axis, said lure body defining a longitudinal hollow extending along said longitudinal axis which defines an inwardly facing circumferential wall of the lure body, a weight mounted within said longitudinal hollow in such a manner as to move back and forth along a substantially center line of the longitudinal hollow, and a cylindrical and hollow weight holding member disposed on the inwardly facing circumferential wall of the lure body closer to a forward end of the lure body in such a manner as to surround and hold said weight via magnetic force acting between said weight and said weight holding member.

2. The fishing lure as set forth in claim 1, wherein said weight is made of magnet, and said weight holding member is made of a magnetic substance having such a property that said weight can be attached thereto via magnetic force effected by said weight.

3. The fishing lure as set forth in claim 1, wherein said weight holding member further comprises a means for gradually reducing said magnetic force which acts between said weight and said weight holding member, as said weight approaches a rear end of said weight holding member.

4. The fishing lure as set forth in claim 3, wherein said magnetic force reducing means is a plurality of through holes which are aligned in said weight holding member in such a manner that their diameters become smaller towards the rear end of said weight holding member.

5. The fishing lure as set forth in claim 3, wherein said magnetic force reducing means is said weight holding member in the form of a plurality of annular rings which are aligned in the axial direction of the longitudinal hollow so that the space between each ring is gradually increased towards the rear end of said lure body.

6. The fishing lure as set forth in claim 3, wherein said magnetic force reducing means is formed in such a manner as to have a surface area of said weight holding member become reduced towards the rear end thereof.

7. A fishing lure comprising a lure body having a longitudinal axis, said lure body defining a longitudinal hollow extending along said longitudinal axis which defines an inwardly facing circumferential wall of the lure body, a weight mounted within said longitudinal hollow in such a manner as to move back and forth along a substantially center line of the longitudinal hollow, and a weight holding member disposed on the inwardly facing circumferential wall of the lure body closer to a forward end of the lure body in such a manner as to surround and hold said weight via magnetic force acting between said weight and said weight holding member, wherein said weight is formed into a cylindrical shape with its axis extending transversely to the longitudinal axis of said longitudinal hollow.

8. A fishing lure comprising a lure body having a longitudinal axis, said lure body defining a longitudinal hollow extending along said longitudinal axis which defines an inwardly facing circumferential wall of the lure body, a weight mounted within said longitudinal hollow in such a manner as to move back and forth along a substantially center line of the longitudinal hollow, and a weight holding member disposed on the inwardly facing circumferential wall of the lure body closer to a forward end of the lure body in such a manner as to surround and hold said weight via magnetic force acting between said weight and said weight holding member, wherein said weight is formed into a wheel shape with an annular groove around a periphery thereof, through which said weight moves along a rail formed in the longitudinal hollow.

9. A fishing lure comprising:
   a lure body having a longitudinal axis, said lure body defining a longitudinal hollow extending along said longitudinal axis which defines an inwardly facing circumferential wall of the lure body,
   at least two weights mounted within said longitudinal hollow in such a manner as to move back and forth along a substantially center line of the longitudinal hollow; and
   a cylindrical and hollow weight holding member disposed on the inwardly facing circumferential wall of the lure body closer to a forward end of the lure body in such a manner as to surround and hold a rearmost weight of said at least two weights via magnetic force.

10. The fishing lure as set forth in claim 9, wherein a rearmost weight of said at least two weights is made of magnet, and said weight holding member is made of a magnetic substance having such a property that said rearmost weight can be attached thereto via magnetic force effected by said rearmost weight.

11. The fishing lure as set forth in claim 9, wherein said weight holding member further comprises a means for gradually reducing magnetic force which acts between said rearmost weight and said weight holding member, as said rearmost weight approaches a rear end of said weight holding member.

12. The fishing lure as set forth in claim 11, wherein said magnetic force reducing means is a plurality of through holes which are aligned in said weight holding member in such a manner that their diameters become smaller towards the rear end of said weight holding member.

13. The fishing lure as set forth in claim 11, wherein said magnetic force reducing means is said weight holding member in the form of a plurality of annular rings which are aligned in the axial direction of the longitudinal hollow so that the space between each ring is gradually increased as they approach the rear end of said lure body.

14. The fishing lure as set forth in claim 11, wherein said magnetic force reducing means is formed in such a manner as to have a surface area of said weight holding member become reduced towards the rear end thereof.

15. A fishing lure comprising a lure body having a longitudinal axis, said lure body defining a longitudinal hollow extending along said longitudinal axis which defines an inwardly facing circumferential wall of the lure body, a weight mounted within said longitudinal hollow in such a manner as to move back and forth along a substantially center line of the longitudinal hollow, and a weight holding member disposed on the inwardly facing circumferential wall of the lure body closer to a forward end of the lure body in such a manner as to partially surround and hold said weight via magnetic force acting between said weight and said weight holding member, wherein said weight has a spherical shape, and said inwardly facing circumferential wall of said lure body has a longitudinal concave having an arcuate cross section which enables said weight to be snugly fitted thereinto.

16. A fishing lure comprising:
    a lure body having a longitudinal axis, said lure body defining a longitudinal hollow extending along said longitudinal axis which defines an inwardly facing circumferential wall of the lure body;
    at least one front weight of nonmagnetic substance and at least one rear weight mounted within said longitudinal hollow in such a manner as to move back and forth along a substantially center line of the longitudinal hollow, in which said at least one front weight of nonmagnetic substance is interposed between said at least one rear weight and a forward end of the lure body; and
    a weight holding member disposed on the inwardly facing circumferential wall of the lure body closer to the forward end of the lure body in such a manner as to hold said at least one rear weight via magnetic force acting between said at least one rear weight and said weight holding member.

17. The fishing lure as set forth in claim 16, wherein said at least one rear weight is made of a magnet and said weight holding member is made of a magnetic substance.

18. The fishing lure as set forth in claim 16, wherein said at least one rear weight is made of a magnetic substance and said weight holding member is made of a magnet.

19. The fishing lure as set forth in claim 16, wherein said weight holding member defines a hole or concave into which said at least one rear weight is partly fitted.

20. A fishing lure comprising:
    a lure body having a longitudinal axis, said lure body defining a longitudinal hollow extending along said longitudinal axis which defines an inwardly facing circumferential wall of the lure body;
    at least two weights mounted within said longitudinal hollow in such a manner as to move back and forth along a substantially center line of the longitudinal hollow; and
    a weight holding member disposed on the inwardly facing circumferential wall of the lure body closer to a forward end of the lure body in such a manner as to partially surround and hold a rearmost weight of said at least two weights via magnetic force, wherein said weights are each formed into a spherical shape, and said inwardly facing circumferential wall of said lure body has a longitudinal rounded concave of such a dimension that said weights can be fitted thereinto.

* * * * *